US006999916B2

(12) United States Patent
Lin et al.

(10) Patent No.: US 6,999,916 B2
(45) Date of Patent: Feb. 14, 2006

(54) METHOD AND APPARATUS FOR INTEGRATED, USER-DIRECTED WEB SITE TEXT TRANSLATION

(75) Inventors: Carol Lin, Newcastle, WA (US); Jacob Kjelstrup, Newcastle, WA (US)

(73) Assignee: Wordsniffer, Inc., Newcastle, WA (US)

( * ) Notice: Subject to any disclaimer, the term of this patent is extended or adjusted under 35 U.S.C. 154(b) by 808 days.

(21) Appl. No.: 10/128,952

(22) Filed: Apr. 22, 2002

(65) Prior Publication Data

US 2002/0194300 A1 Dec. 19, 2002

Related U.S. Application Data

(60) Provisional application No. 60/285,580, filed on Apr. 20, 2001.

(51) Int. Cl.
G06F 17/20 (2006.01)
(52) U.S. Cl. .................. 704/8; 704/2; 709/217
(58) Field of Classification Search ............... 704/2, 704/8; 709/217
See application file for complete search history.

(56) References Cited

U.S. PATENT DOCUMENTS

| | | | |
|---|---|---|---|
| 5,751,957 A | 5/1998 | Hiroya et al. | |
| 5,787,386 A | 7/1998 | Kaplan et al. | |
| 5,987,402 A * | 11/1999 | Murata et al. | ................. 704/2 |
| 6,112,174 A * | 8/2000 | Wakisaka et al. | ........... 704/251 |
| 6,330,529 B1 | 12/2001 | Ito | |
| 6,338,033 B1 | 1/2002 | Bourbonnais et al. | |
| 6,615,178 B1 * | 9/2003 | Tajima | ...................... 704/277 |

* cited by examiner

*Primary Examiner*—Daniel Abebe
(74) *Attorney, Agent, or Firm*—Barry L. Davison; Davis Wright Tremaine LLP

(57) ABSTRACT

The present invention provides an integrated method, implemented over a wide area network or wireless network, comprising a server side and a client side, for user-directed acquisition of reference information, such as dictionary definitions ("look-ups") or language translation, relating to user-selected messages or user-selected text of World Wide Web ("Web") site pages. The method steps, for Web use, are integrated into either a server-side web site or into a client-side system. In particular embodiments, reference information relating to user-selected Web page includes high quality multi-lingual translations, explanations, illustration and/or consolidated automatic multi-dictionary definitions, wherein such information is displayed to the user in text, voice, image or multi-media formats. The present invention also provides an apparatus for user-directed acquisition of information relating to user-selected Web page text. The present invention further provides an integrated method, over a wireless network for user-direct acquisition of real-time translation and reference services in both text and voice.

30 Claims, 10 Drawing Sheets

IN THE SUPREME COURT OF FLORIDA
CASE No. SC00-2346

PALM BEACH COUNTY    vs.    KATHERINE HARRIS. ETC.
CANVASSING BOARD            ET AL

Petitioner/Appellants            Respondents/Appellants

MOTION FOR PRO HAC VICE APPEARANCE
BEFORE THE SUPREME COURT OF FLORIDA

With TurboDictionary

METHOD AND APPARATUS FOR INTEGRATED, USER-DIRECTED WEB SITE TEXT TRANSLATION

This application claims benefit of U.S. provisional patent application Ser. No. 60/285,580, filed on Apr. 20, 2001.

FIELD OF THE INVENTION

This invention relates to an apparatus and integrated method for acquisition of information relating to specific user-selected text of World Wide Web site pages, and more particularly to an apparatus and site-integrated method for providing high quality multi-lingual translations, explanations, and consolidated automatic multi-dictionary definitions of such text, in text, voice, image or multi-media format.

BACKGROUND

Globalization and strategic partnering provide businesses with means for lowering costs and increasing revenue. Globalization of commerce is increasingly viewed as a requirement for businesses to remain viable in competitive markets. The Internet, in this competitive context, has developed not only as an important medium for entertainment and information exchange, but also as a forum for facilitating or conducting commerce, including global commerce.

Presently, commercial and informational World Wide Web sites ("web sites") can be grouped roughly into one of two system categories: (1) provider-driven (i.e., content provider-, product seller-driven) or (2) consumer-driven (i.e., content or product consumer-driven. The difference between provider- and consumer-driven web sites or systems lies not only in which party takes the initiative to find the other, but also in which data set is used as the basis for relating the products, services or information. In a typical provider-driven system, the provider posts content in a single language, and holds itself out to the consumer using untargeted or generalized consumer data. By contrast, the consumer, in a consumer-driven system, seeks out the seller using real (i.e., qualified, tailored or targeted) consumer data.

Provider-driven systems; passive and active formats. Most current Internet informational and commerce systems are provider-driven and are either passive or active sites. A typical provider's Internet site is a passive advertising site that provides information about the content/product in a single language (usually English) and directs a generalized base of potential consumers to places where they can obtain the content/product.

A smaller number of providers have active sites that not only provide information, but also allow potential consumers to conduct a transaction over the Internet to obtain consumer-specific information or to purchase a product. The provider categorizes the content-prices, packages the information/product, and then holds it out for consumption or sale to potential consumers via the Internet. Typically, this information is presented and accessed in a single language on a given site.

Locating the desired content/product in provider-driven systems is typically a time-consuming process and often frustrating. Potential consumers must initially find the provider site, search and identify the content/product(s), and either aggregate (e.g., down-load and store) the desired information, or accept the seller's product terms or find another seller whose terms are acceptable. Information content on provider-driven sites is not typically tailored to the needs of particular consumers. For example, a potential consumer may fail to identify product information, or complete a product-related transaction if such consumer does not understand the language (e.g., English, Chinese, etc.) or technical terms of the commercial site. A typical consumer has neither the time nor the reference resources (e.g., specialized dictionaries, etc.) to effectively translate and research the language and technical or specialized terms of art associated with a given commercial web site to enable educated, informed decision making. Moreover, even if the reference resources were independently available to a potential consumer, the consumer would need to exit the site and spend considerable time accessing and consolidating the reference information. This has a negative impact on the "stickiness" of a site, because after such off-site activity, there is a high likelihood that the potential consumer will never return to the commercial web site, having been effectively deterred by the formidable tasks of translation and consolidation of information.

The magnitude of this problem, for a global consumer base, is readily appreciated by considering present web site demographics. Currently, 75% of all web sites are in English only. Even more significantly, 96% of E-commerce web sites are in English only. However, by 2003, 75% (696 million) Internet users will not be native English speakers, and 50% of the projected worldwide $1.2 trillion online B2B commerce will come from outside the United States.

Because of difficulty in user acquisition of explanatory information relating to Web site content, products sold on provider-driven sites are typically limited to lower-priced standardized goods such as books, compact disks, and videos that are suitably distributed to a generalized consumer base, comprised of those consumers that understand the language of the particular site.

Prior approaches to solving e-commerce web site globalization problems in provider-driven systems. Currently, approaches to globalization of commercial web sites include translation, and limited use of consumer-driven systems. For example, globalization of provider-driven sites is typically approached (at least by those companies that can afford it) by full text translation, either via "localization" (human translation) or "machine" translation. Globalization of a web site via localization is very costly, averaging $250,000 per site per language, and with annual maintenance costs exceeding $50,000 per site per language. To many companies it is cost prohibitive. Furthermore, many companies need to have sufficient business intelligence before making the investment to launch into a foreign market.

Full text machine translation (e.g., using Systran, IBM, SDL, etc.) is relatively less expensive, but typically yields laughable results. Machine translation attempts to translate full sentences and paragraphs, but currently provides poor results because of contextual complexity and ambiguity. Significantly, such flawed machine translations can damage corporate image and/or incur liability risk resulting from mistranslation. Some improvement in machine translation, and/or liability reduction might potentially be gained if the translation, or parts thereof, were to proceed by executable modules, downloaded to the user. However, such modules would likely be usually large and take a long time for a user to download, especially if the user has a slow connection to the Internet. Even users with high-speed Internet access may have problems with the executable modules, because many network firewalls are designed to keep these modules from being downloaded onto the user's system. In addition, the downloaded executables pose substantial browser compatibility problems. Finally, if the commercial website were to make any changes to its configuration process, a new module would need to be downloaded every time the process changes. Thus, like "localization," machine translation is not desirable for companies wishing to post alternative-language versions of their web sites.

Consumer-driven systems. The use of client- or consumer-driven systems to reach a more global consumer base has also been contemplated. In a consumer-driven system, the consumer typically specifies the desired content requirements, or the product purchase terms, and then "posts" this specification for provider access. Some examples of consumer-driven systems on the Internet are "news groups" and "bulletin boards," where any potential consumer can post "wanted" advertisements at little or no cost.

Consumer-driven Internet systems have inherent benefits that other systems do not. For example, where a large number of potential providers exist, but those providers do not have the resources to advertise globally it makes sense for consumers, if they can, to take the initiative in communicating their needs to them. Theoretically, the Internet is an ideal medium upon which to address this situation because Internet postings are global, and the posted consumer data theoretically communicates a need/offer to a large number of potential providers. Moreover, such consumers can, at least in principle, exercise more control in limiting content to desired categories, or in setting the terms and conditions of their specific purchases, by strategically tailoring their posted consumer data.

However, despite these advantages, existing consumer-driven systems have substantial drawbacks for both consumers and providers. Significantly, it is difficult, if not impossible for providers to efficiently target the needs of a consumer base that is scattered across the Internet, and comprised of amorphous and undiscriminating newsgroups, bulletin boards, and the like that host unqualified postings that may be in a variety of languages.

Moreover, even in the case of qualified consumers, each consumer typically has different content requirements or purchasing specifications, and communicates his or her needs to providers using a non-standard format using, e.g., different languages, features, attributes, conditions, terms, or language styles. Translating, interpreting and addressing such non-standard specifications simply requires too much time of the typical provider.

Consumers are likewise deterred from using current consumer-driven systems. For example, the potential consumer may refrain from using such a system where he or she has little or no control over the nature and amount of content provided in response to the particular consumer data posted. Additionally, the consumer may be reluctant to post content/product/service needs where he or she has little or no experience with the particular content/product/service and is unable to effectively address the lack of knowledge. These concerns are compounded where the desired information content or the product being sold is available in multiple, highly technical, complex data or product configurations.

Thus client/consumer driven systems, like full-text machine translation or human localization approaches, do not address the globalization problems for businesses with commercial web pages that post content and/or transact in a single language format.

Prior approaches to solving e-commerce web site globalization problems in consumer-driven systems. Various approaches in the art have been employed to aid the client/consumer in translation. RichLink and Babylon represent typical prior art approaches. RichLink is a product that allows a client to customize definitions of particular words and phrases that occur on a web page. However, the process is not automatic and to do so, the client must first leave the web page to obtain the definition from individual separate sources, and then the definition must be manually entered and maintained on the web page. Likewise, Babylon provides limited translation of user-selected words, but is not integrated into providers web pages, and requires downloaded software to be resident and executable on the client side.

Therefore, there is a need in the art for cost-effective methods of high quality globalization of commercial web sites. There is a need in the art to render commercial web sites, such as provider-directed web sites, more accessible and responsive to the multi-lingual characteristics of individual global clients. There is a need in the art for methods of web site translation that do not require full-text human or machine translation. There is a need in the art for web site-integrated translation and data-mining methods for tailoring content on otherwise generalized provider-driven commercial web sites to address the needs of a global client base. There is a need in the art to reduce the amount of client-side processing involved with conducting commercial web site translations and transactions. There is a need in the art to enhance commercial web site "stickiness" for an increasingly global client base whose first language is not that of the site. There is a need in the art for a cost-effective apparatus and web site-integrated method for providing high quality simultaneous searching of multiple dictionaries to obtain multi-lingual translations, explanations, and consolidated automatic multi-dictionary definitions of user-selected text, in text, voice, image or multi-media format.

SUMMARY OF THE INVENTION

An object of the present invention is to provide an integrated method, over a wide area network comprising a server side and a client side, for user-directed acquisition of information relating to user-selected text of World Wide Web site pages. The inventive apparatus and methods provide a cost-effective apparatus and web site-integrated method for providing high quality simultaneous searching of multiple dictionaries to obtain multi-lingual translations, explanations, and consolidated automatic multi-dictionary definitions of user-selected text, in text, voice, image or multi-media format.

The method comprises: selecting, by a user, a word of web page text, whereby the user-selected word is accessible by an information retrieval function; selecting, by a user, from a plurality of reference sources or translation language pairs, a reference source or a translation language pair, whereby the user-selected reference source or user-selected translation language pair is accessible by an information retrieval function; accessing, in accordance with the user-selected reference source or user-selected translation language pair, and using the information retrieval function, information relating to the user-selected word; and displaying to the user the information related to the user-selected word, whereby user-directed acquisition of information relating to user-selected text of World Wide Web site pages is achieved.

In particular embodiments, the method steps are integrated into a server-side web site by either incorporating into the site a reference window linked to the information retrieval function, or linked pull down menus, or by installing programmed script on all web pages of the site to link and enable the information retrieval function. In alternate embodiments, the method steps are integrated into a client-side system using downloadable software, or a browser plug-in that is linked to the information retrieval function. Preferably, selecting a word of web page text is achieved by either typing or pasting a copied word into a window linked to an information retrieval function, or by highlighting the word whereby such highlighting renders the user-selected word accessible by an information retrieval function. In particular embodiments the reference source comprises one or a plurality of dictionaries. Preferably, information relating to user-selected text of World Wide Web site pages consists of high quality multi-lingual translations, explanations, or consolidated automatic multi-dictionary definitions, wherein such information is displayed to the user in text, voice, image or multi-media formats. Preferably, the information retrieval function further comprises an Internet search engine operative with the information retrieval function to search the Internet in accordance with the user-selected text, and the user-selected reference source or user-selected translation language pair, whereby the information retrieval function is augmented.

An alternate embodiment provides a method, over a wide area network comprising a server and a client, for user-directed acquisition of information relating to user-selected text of World Wide Web site pages, comprising: receiving from the client a user-selected word of World Wide Web page text; receiving from the client a user-selected reference source or user-selected translation language pair; accessing information relating to the user-selected word, in accordance with the user-selected reference source or user-selected translation language pair; and transmitting to the client the accessed information relating to the user-selected word. Preferably, the method further comprises an Internet search engine operative with server to search the Internet in accordance with the user-selected text, and the user-selected reference source or user-selected translation language pair.

An additional embodiment provides an apparatus for user-directed acquisition, over a wide area network comprising a server side and a client side, of information relating to user-selected text of World Wide Web site pages. The apparatus comprises: a server connected to the network, wherein the server comprises a processor, a memory, and a storage device, and wherein the processor and memory are operative with a program stored on the storage device to receive a user-selected word of World Wide Web page text; receive a user-selected reference source or user-selected translation language pair; access, in accordance with the user-selected reference source or user-selected translation language pair, information relating to the user-selected word; and transmit the accessed information relating to the user-selected word to the client-side user. Preferably, the apparatus comprises an Internet search engine operative with the server to search the Internet in accordance with the user-selected text, and the user-selected reference source or user-selected translation language pair.

Further embodiments provide an apparatus and integrated method, over a wireless network comprising a server side (e.g., WAP-based) and a client side (e.g., cellular phones, or other PDA wireless devices, such as Palm PC, Pocket PC, PSION, etc.), for user-directed acquisition of real-time translation and reference services (including voice-to-text, voice-to-voice, text-to-voice and text-to-text translations and reference services) in both text and voice, using standard cellular phones and PDA devices. Preferably, this embodiment is implemented as part of a wireless subscription service for end users by wireless service providers. Preferably, communication proceeds between a "master" user, having a subscribing wireless device (e.g., phone), and a "slave" user, having either a plug-in headset connected to the master device, or having another wireless device accessible by the master device. Preferably the system is implemented using a plurality of "slave" devices, in connection with one or more master "devices" receiving messages in one or more translated languages. Preferably, master users may retrieve information related to selected voice or text, where such related information comprises high quality multi-lingual translations, explanations, illustrations and/or consolidated automatic multi-dictionary definitions ("look-ups"), and wherein such information is displayed to the user in text, voice, image or multi-media formats that are compatible with the user's wireless device, and with the user's native language or character set.

BRIEF DESCRIPTION OF THE DRAWINGS

FIG. 8 (lower panel) shows such a WAP server-based wireless method embodiment. A "master" user 84 selects one or more translation language pairs using a GSM phone 86 accessible by a WAP server 88 hosting the inventive information retrieval function. The user sends a voice message using the cellular phone, and the message is processed using voice-recognition software stored in the memory of the WAP server and operative with a processor of the server to recognize the voice and process it into text. The information retrieval function translates the text, which is then converted to voice by the voice recognition function, and delivered as a translated voice message over the wireless network to the "slave" users 88.

DETAILED DESCRIPTION OF THE INVENTION

Figure 1:
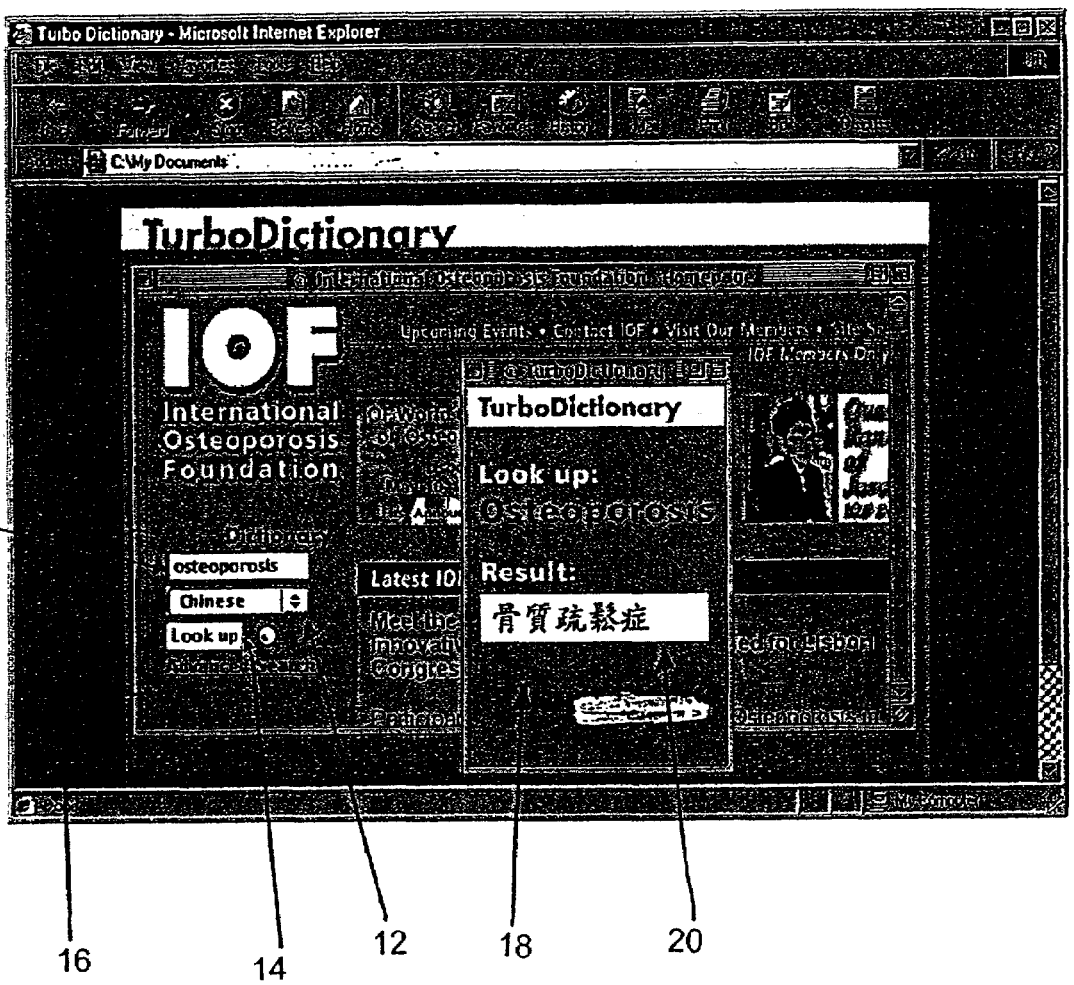
FIG. 1 is a screen shot of a typical provider-driven Web page, illustrating a server-side Web site-integrated embodiment of the inventive method for user-direct acquisition of user-selected Web page text. Various fields (10, 12 and 14) in a Web page-integrated "reference" window 16, or one or more fields 20 in an integrated "result" window 18 are used to select text and user preferences, and to display retrieved information, such as a language translation (e.g., English→Chinese), related to the user-selected text (e.g., word-by-word translation, according to the present invention). The method involves user selection of Web page text, further user selection of preferences for specific reference sources and/or translation language pairs from a plurality of such reference sources and/or languages, and acquisition of related information from a linked information retrieval function, according to the user selected preferences. The method occurs in real-time, and does not require the user to exit the provider-driven Web site.

Described below are various embodiments of the present invention. The embodiments illustrate various ways in which the present invention can be implemented—in this case, an apparatus and integrated method for user-directed acquisition of information relating to user-selected text of World Wide Web ("WEB") site pages, and an apparatus and integrated method, over a wireless network comprising a server side (e.g., a WAP-based server) and a client side (e.g., cellular phones, or other PDA wireless devices), for user-directed acquisition of real-time translation and reference services. The invention is particularly useful in those instances where the language and character-set of the Web site differ from the native language and character set of the user.

The present invention affords typical provider-driven web sites with an immediate, accurate, and low cost multilingual presence by expanding their site audience to include other language speakers. Additionally, integration of reference and/or result windows and fields increases the number site page views, thus providing more advertising revenue. The present invention will enhance revenue by increasing sales to other language speakers, because such users will be enabled to navigate the Web site and educate themselves about the products in their own languages to make informed transactional decisions. Furthermore, the present invention provides a novel method to collect business intelligence and understand foreign markets, based on the words translated and/or on which products or related information are selectively accessed by particular language groups.

The embodiments of the inventive apparatus and method provide a practical and inexpensive means by which Web sites, such as typical provider-driven commercial Web sites (see "Background," herein above), may be rendered more accessible by a global consumer base comprised of individual users, communicating in one of a plurality of native languages and native character sets. More specifically, the embodiments provide an apparatus and integrated method, over a wide area network comprising a server side and a client side, for user-directed acquisition of information relating to user-selected text of Web site pages, using the portion of the Internet known as the Web. In particular embodiments, such related information comprises high quality multi-lingual translations, explanations, illustrations and/or consolidated automatic simultaneous multi-dictionary definitions ("look-ups"), wherein such information is displayed to the user in text, voice, image or multi-media formats that correspond, or are at least compatible with the user's native language or character set. The invention thus allows for globalization of Web sites to proceed in the absence of expensive and inaccurate full-text translations.

Using the inventive apparatus and method, a user connects to a Web site from their client computer (internet compatible PDA or other cellular or hand-held device). The inventive apparatus and method achieve their efficiency, at least in part, by enabling a user to acquire reference information related to specific Web site text in the absence of full-text machine translation or human "localization" (see "Background," herein above). This is because most users that are not native English speakers, speak some English as their second or third language, and they need assistance primarily with vocabulary and not grammar. Thus, the present invention offers text translation (e.g., word-by-word translation) and illustration that will effectively achieve the same purpose as a fill-text machine translation or localization. Additional efficiency is gained, in preferred embodiments, where the method is integrated into a server-side web site, by either incorporating into the site a reference window or pull down menus linked to the inventive information retrieval function, or by installing programmed script on all web pages of the site to link and/or enable the information retrieval function. In alternate embodiments, the method steps are integrated into a client-side system using downloadable software or browser plug-ins that link user-selected text and preferences to the information retrieval function.

The method involves the user "selecting" or highlighting specific Web page text (e.g., word-by-word selection), and then further selecting specific reference sources and/or translation language pairs from a plurality of reference sources and/or translation language pairs. The user-selected text and preferences (variables) are accessible by an information retrieval function comprising a server connected to the network, wherein the server comprises a processor, a memory, and a storage device, and wherein the processor and memory are operative with a software program stored on the storage device to: receive the user-selected Web page text (e.g., user-selected word); receive a user-selected reference source and/or user-selected translation language pair; access, in accordance with the user-selected reference source and/or user-selected translation language pair, information relating to the user-selected text; and transmit the accessed information relating to the user-selected text to the client-side user. Preferably, such information transmittal is in the user-selected translation language, which can be the user's native language. The memory element of the information retrieval function comprises an extensive collection of dictionaries and reference books to enable retrieval of related information using a variety of languages, including but not limited to all European languages, Chinese, Korean, Japanese, Russian and Hebrew.

The information retrieval function, as will be obvious to those of ordinary skill in the art, may comprise one or more linked servers comprising one or a plurality of processors, a memory, and storage devices operable programmed and configured to carry out the information retrieval function.

Figure 2:
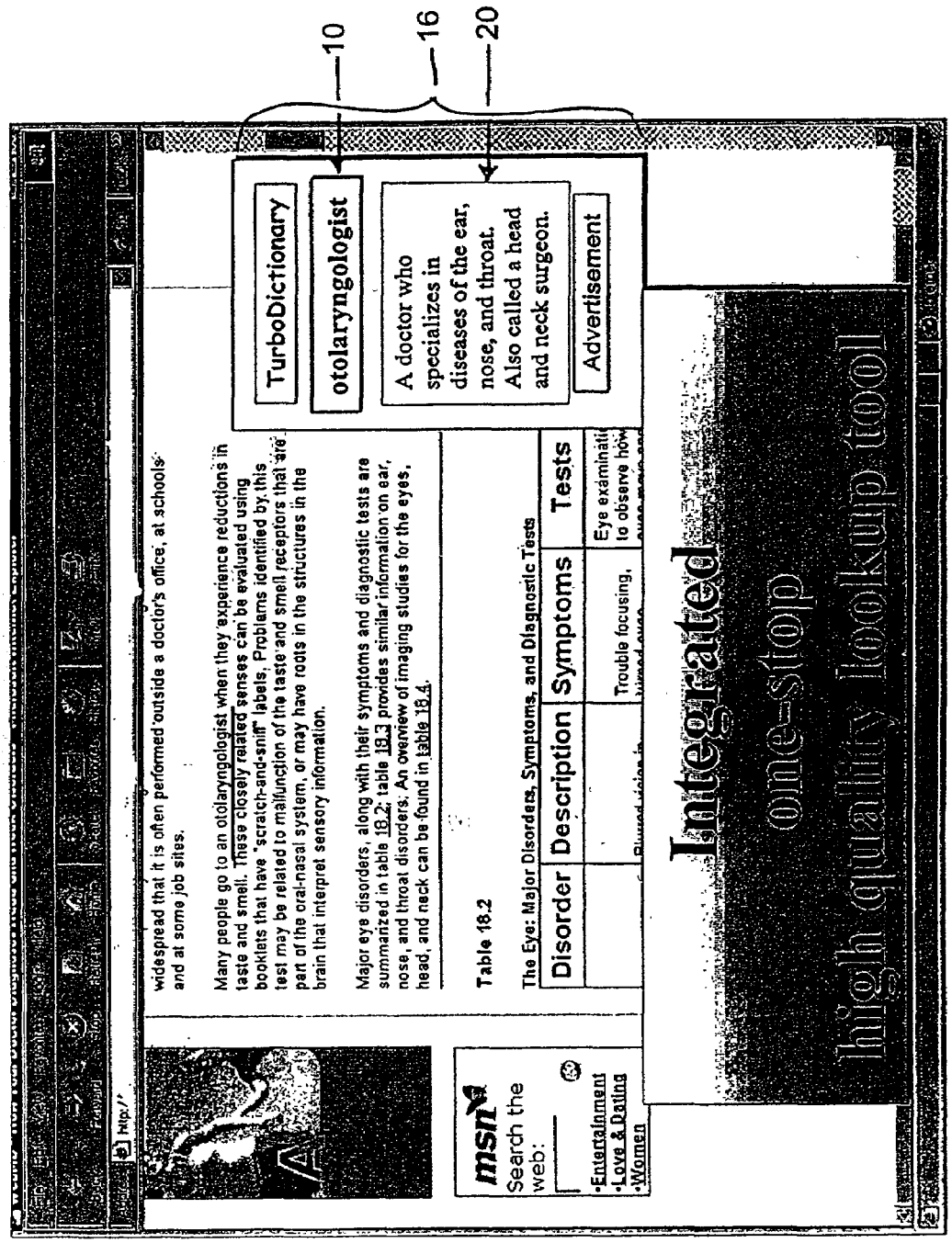
FIG. 2 is a screen shot, similar to that of FIG. 1, of a typical provider-driven Web page, illustrating another server-side Web site integrated embodiment of the inventive method for user-direct acquisition of user-selected Web page text. In this embodiment, information related to user-selected Web page text (i.e., a dictionary "look-up," or definition of "otolaryngologist") that is acquired via the linked information retrieval function, is displayed in a field 20 of the Web site-integrated "reference" window 16.

FIG. 1 and FIG. 2 illustrate a first embodiment of the overall method a user goes through to acquire information relating to specific user-selected Web page text. In this example, a Chinese user desires a translation into Chinese of the English term "osteoporosis," present as text on a provider-driven, server-side Web site. To begin the method, the user establishes a network connection between the client and the server. Using a client-side Web browser, the user "selects" the desired text by "copying" the word "osteoporosis" from the upper-left quadrant of the Web page, and "pasting" it to a text field 10 in a reference window 16 (present in the lower-left quadrant of the Web page) that is integrated into the Web page, and that is linked to an information retrieval function (discussed below). Alternatively, the desired text may be typed into the text field 10.

The user selects, from a plurality of reference sources (e.g., a professional medical dictionary) and/or translation language pairs (e.g., English→Chinese), a reference source and/or a translation language pair, whereby the user-selected reference source or user-selected translation language pair is accessible by the information retrieval function. For example, in the present embodiment, the user preference for a particular translation language pair, from among a plurality of such pairs, is selected using a scrollable language pair field 12 of the linked dictionary window 16. Other selection means such as right-clickable "pop-up" menus (discussed herein, below) are also encompassed by embodiments of the present invention, and are familiar in the art.

The user accesses information relating to the user-selected text, in accordance with the user-selected reference and/or translation language preferences, by activating the information retrieval function. This is accomplished in the example of FIG. 1 by clicking on a "look up" button 14 within the dictionary window. The information retrieval function comprises a server connected to the network, wherein the server comprises a processor, a memory, and a storage device, and wherein the processor and memory are operative with a program stored on the storage device to: receive user-selected Web page text (e.g., a selected word); receive a user-selected reference source preference (e.g., a professional medical dictionary) and/or a user-selected translation language pair preference (e.g., English→Chinese); access information relating to the user-selected text in accordance with the user-selected reference and/or language preferences; and transmit the accessed related information to the client-side user.

In preferred embodiments, a list of desired dictionaries is selected from a dictionary list by the user to define (e.g. narrow) the search. Preferably, this is a standard linear list selected either explicitly by the user, or implicitly by the user by virtue of pre-stored user preferences accessible to the information retrieval function (e.g., by means of a stored 'cookie').

The inventive information retrieval function accesses the user-selected text and user preferences (e.g., reference sources, language pairs) to search (using art-recognized search engine technology), process, rank and sort related information stored in one or more data bases, and then transmits the accessed related information to the user. This is accomplished using various art-recognized algorithms and data structures.

In preferred embodiments, hashing and/or Btree data structures are used to efficiently process matching (relevant) data sets from an initial search. Preferably, 'hashing' is used to quickly reduce or minimize the data set that matches a query term, enabling a simpler search within a relatively smaller data set. Preferably, 'BTree' data structures are used to reduce the frequency of disk access during a search. A 'BTree' data structure uses nodes arranged in a tree structure to search for data that is contained in its nodes. 'BTree' nodes, compared with those of other tree-based data structures, are contained within relatively larger 'pages' that match the physical size of disk blocks, thereby reducing the number of disk access events for a given search.

To find words within phrases, the information retrieval function uses pointers. Each word within a phrase becomes a 'child' node that points back to the 'parent' node, which contains the phrase. For phrases consisting of a single word, there is no 'child.'

Preferably, terms (words) used for searching are further refined by applying a number of transformations, including but not limited to: (i) stemming, to find roots of words (e.g., "jumped" becomes "jump"); (ii) stop word removal (e.g., in the case of English, removal of "a," "the," "an," etc.); and (iii) word splitting into individual sub-words (e.g., "superheated" becomes "super" and "heated").

In preferred embodiments, the retrieved data set is analyzed for relevancy using various criteria including, but not limited to, hit counting within the term itself, proximity of words, exact v. sub-phrase matching, and hit counting within word definition areas. Each term within each dictionary is assigned a score, based on the relevancy algorithm. A sort algorithm is applied to the ranked data set and the top N results are displayed to the user. The user may optionally select to see the next N results, and so on.

The retrieved ranked and sorted information data set relating to the user-selected word is displayed to the user using an integrated result window 18, or in the alternative using one or more result fields 20 within the integrated reference window 16 (FIG. 2) or integrated result 18 window (FIG. 1). Thus, users have the ability not only to select which information sources are accessed, but may compare the results from alternate reference sources in real time without leaving the Web site. Various types of information retrieval is encompassed by the present invention, including but not limited to high quality multi-lingual translations, explanations, illustrations and consolidated automatic multi-dictionary definitions, wherein such information is displayed to the user in text, voice, image or multi-media formats that correspond, or are at least compatible with the user's native language and/or character set.

In particular embodiments the above-described method steps are integrated into a server-side Web site. In these embodiments the provider-driven site enables its users to acquire information relating to user-selected text by hosting or integrating the inventive method and information retrieval function on the provider-driven site. Such integration is achieved, for example, by incorporating into the site a reference window (e.g., like reference window 16 of FIG. 1 and FIG. 2) linked to the information retrieval function. For example, in the example of FIG. 1, selecting Web page text is achieved by "pasting" a "copied" word into a text field 10 of a reference window 16, linked to an information retrieval function. This requires that the server-side Web site be integrated with a window having a link to the information retrieval system and software.

Figure 3:
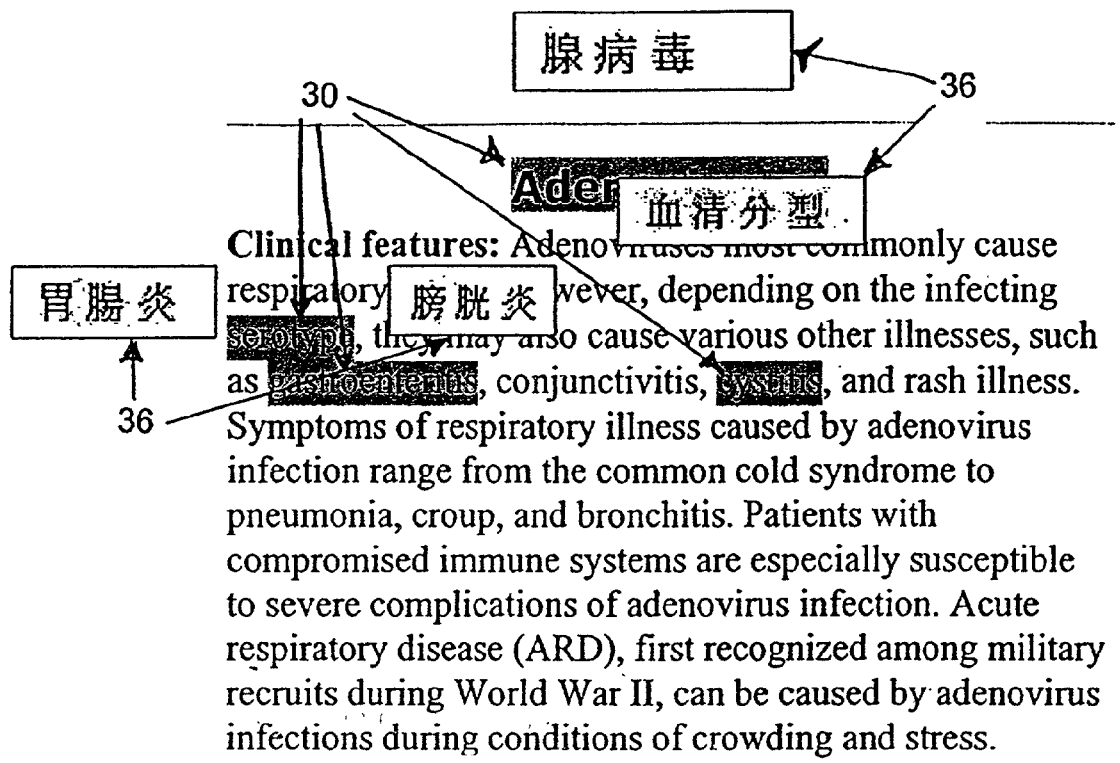
FIG. 3 is a screen shot, similar to that of FIGS. 1 and 2, of a typical provider-driven Web page, illustrating an additional server-side Web site-integrated embodiment of the inventive method for user-direct acquisition of user-selected Web page text. Here, Web site integration is accomplished by installing executable script (e.g., JavaScript™) on all web pages of the site to link and enable the information retrieval function. A 'right-click' of highlighted text 30 using a mouse can be used to activate one or more pop-up menus for user selection of particular reference source and/or translation language preferences (in this examples, the English→Chinese language pair preference was selected), and to enable activation of the information retrieval function to provide for a displayed translation 36 in one or more window fields using a Chinese character set.
Figure 4:
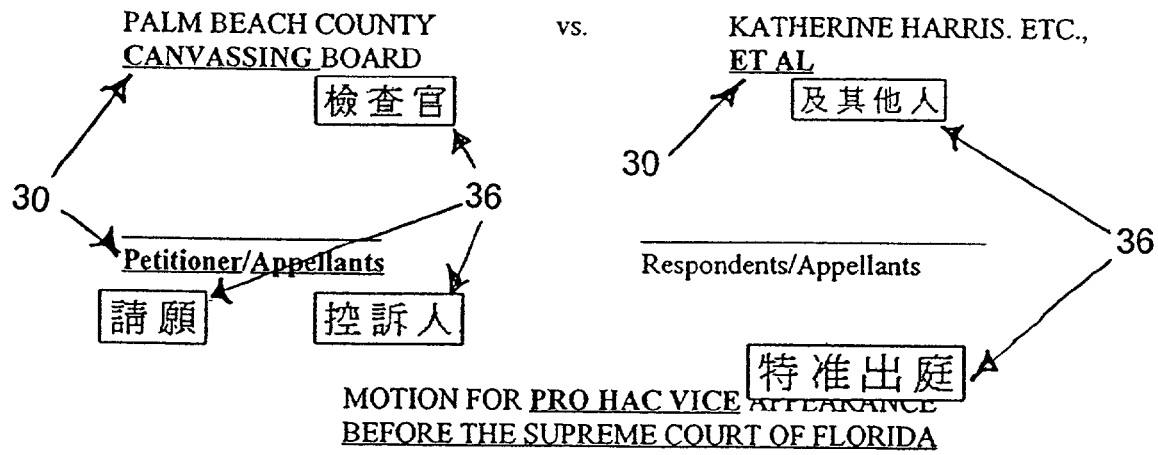
FIG. 4 is a screen shot of another server-side Web site-integrated embodiment of the present invention similar to that illustrated in FIG. 3. The integrated web page is displayed in the upper half of the figure. In the lower half of the figure, a right click of a mouse was used to activate pop-up menus, select user preferences, and acquire information related to user-selected Web site text (in this case, translation of legal-related text from a court opinion into Chinese characters).

FIGS. 3 and 4 illustrate an alternative embodiment of server-side Web site integration of the inventive method. In the these examples, Web site integration is accomplished by installing executable script (e.g., JavaScript™) on all web pages of the site to link and enable the information retrieval function. In such embodiments, a right-click of highlighted text 30 using a mouse can be used to activate a pop-up menu for user selection of one or more particular reference source and/or translation language preferences (in these examples, the English→Chinese preference was selected), and enable activation of the information retrieval function to provide for a displayed translation 36 in one or more window fields using a Chinese character set.

Figure 5:
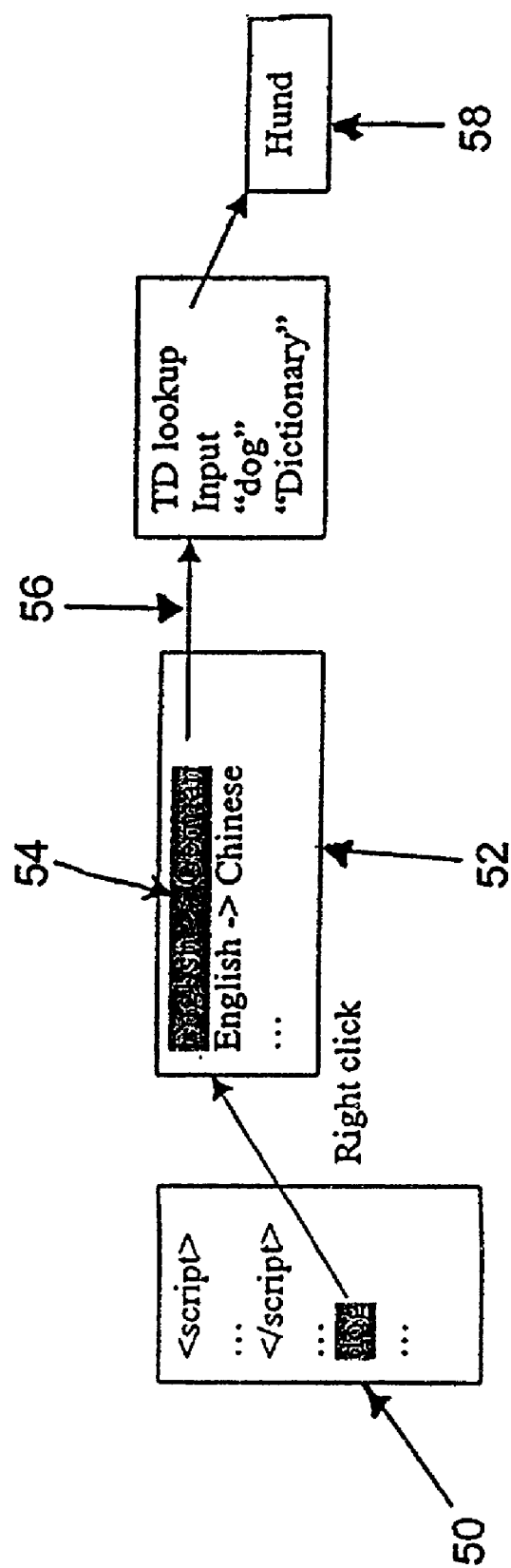
FIG. 5 shows a high-level flow diagram of the inventive method steps associated with the server-side Web page-integrated embodiments shown in FIGS. 3 and 4. A "mouse" right-click is made on selected text 50. One or more resulting "pop-up" menus 52 allow a user to select preferences 54 for reference source (e.g., dictionary) and/or translation language pair (e.g., English→German), and to activate 56 an information retrieval function to look-up and translate the selected word into the selected language, which is displayed in an integrated window field 58. Here, the English word "dog" is translated into German ("Hund"), according to one embodiment of the inventive method.

FIG. 5 shows a high-level flow diagram of the inventive method steps associated with the server-side Web page-integrated embodiments shown in FIGS. 3 and 4. A "mouse" right-click is made on selected text 50. One or more resulting "pop-up" menus 52 allow a user to select preferences 54 for reference source (e.g., dictionary) and/or translation language pair (e.g., English→German), and to activate 56 an information retrieval function to look-up and translate the selected word into the selected language, displayed in an integrated window field 58. Here, the English word "dog" is translated into German ("Hund"), according to one embodiment of the inventive method.

In alternative embodiments, the user takes the initiative to install or integrate the method steps into a client-side system using, for example, a downloadable browser "plug-in" that facilitates linking to the above-described information retrieval function. A user can then use the inventive method on any provider-driven Web site, regardless of whether or not a server-side embodiment of the inventive method has been integrated into the provider-driven Web site.

Figure 6:
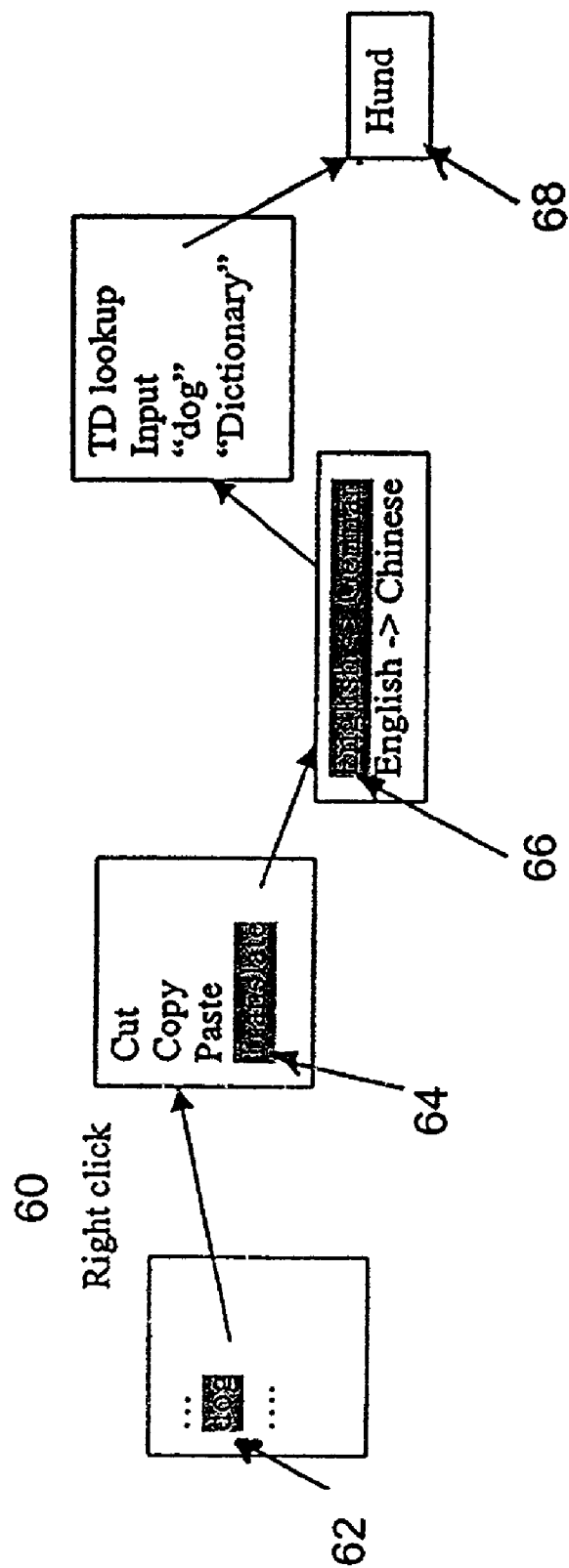
FIG. 6 is a high-level flow diagram of the inventive method steps associated with an alternate client-side embodiment of the present invention. An end user downloads a browser "plug-in" which allows the user to use "mouse" right-clicks 60 on user-selected text 62 to select reference 64 and language 66 preferences, and to retrieve information 68 (here, a translation into German) related to user-selected Web page text on any Web page, including pages on those Web sites that do not have a server-side embodiment of inventive method.

FIG. 6 is a high-level flow diagram of the inventive method steps associated with an alternate client-side embodiment of the present invention. An end user downloads a browser "plug-in," which allows the user to use "mouse" right-clicks 60 on user-selected text 62 to select reference 64 and language 66 preferences, and to retrieve information 68 (here, a translation into German) related to user-selected Web page text on any Web page, including pages on those Web sites that do not have a server-side embodiment of the inventive method.

In the foregoing embodiments, the user-selected text translation (or "look-up") and retrieved information display language and character set may be the same as, or different from the language and character set of the Web page being translated or interpreted. In either case, particular embodiments of the present invention have the character of a personalized (user-directed) education center, whereby users can effectively navigate, translate, interpret and perform transactions on provider-driven Web sites regardless of their native language or character set. User selectable reference sources include, but are not limited to electronic databases comprising dictionaries, thesauruses, encyclopedias, digital images, multi-media content (e.g., sound and video). Such reference sources may comprise data corresponding to a variety of languages and character sets, including but not limited to all European languages, Chinese, Korean, Japanese, Russian and Hebrew, and the character sets thereof.

An additional novel feature of the present invention is "data mining." The present invention can be combined using art-recognized statistical methods and algorithms to provide consumer data mining statistics according, for example, to country, language, topic and product. Such data mining capability enhances the globalization utility of the present invention by allowing provider-driven sites, which have been traditionally limited to presenting content to an amorphous generalized consumer base (see under "Background," above), to understand their audiences and market, and optimize presentation of posted content.

System hardware. E-commerce consumers do not have an intelligent, fast and reliable method for accessing and performing transactions on Web sites that do not post content in their native languages. The present invention addresses this need by creating a software (herein described as TurboDictionary™) able to efficiently allow for "on-line" acquisition of information (e.g., translation and dictionary look-ups) related to user-selected text, and according to user-selected preferences. The method derives its novelty and utility, at least in part, by taking advantage of the fact that most on-line users that do not speak English as their native language are nonetheless familiar with it as a second or third language, and thus need primarily only help with vocabulary. Thus, translation of user-selected text, according to the present invention, circumvents the necessity of full-text machine or human localization (see under "Background," above), which is expensive and typically flawed. In preferred embodiments, as described above, the invention is implemented as an integrated method on the server-side, requiring little, if any client-side processing. Thus, a consumer can access the Internet using a computer or electronic hand-held device. The software program of the present invention is usable over a network, preferably over the Internet, and most preferably over the World Wide Web ("Web").

The apparatus of the present invention encompasses a computer network comprising a server, at least one user (client) subsystem connected to the server via a network connecting means (e.g., user modem). Although referred to as a modem, the user modem can be any other communication means that enables network communication, for example, ethernet links. The modem can be connected to the server by a variety of connecting means, including public telephone land lines, dedicated data lines, cellular links, microwave links, or satellite communication.

The server is essentially a high-capacity, high-speed computer that includes a processing unit connected to one or more relatable data bases or content sources, comprising, for example, electronic dictionaries, thesauruses, encyclopedias, digital images, multi-media content (e.g., sound and video, streaming video). Such content may comprise data corresponding to a variety of languages and character sets, including but not limited to all European languages, Chinese, Korean, Japanese, Russian and Hebrew, and the character sets thereof. Additional databases are optionally added to the server. Also connected to the processing unit is sufficient memory and appropriate communication hardware. The memory can be a separate, but connected component. The communication hardware may be modems, ethernet connections, or any other suitable communication hardware. Although the server can be a single computer having a single processing unit, it is also possible that the server function could be spread over several networked computers, each having its processor and having one or more databases resident thereon. In particular embodiments of the present invention the server can be WAP-based server of a wireless network (see "Wireless Device Applications," below).

In addition to the elements described above, the server further comprises an operating system and communication software allowing the server to communicate with other computers. Various operating systems and communication software may be employed. For example, the operating system may be Microsoft Windows NT™, and the communication software Microsoft IIS™ (Internet Information Server) server with associated programs.

According to the present invention, the server is connected to the network, wherein the server comprises a processor, a memory, and a storage device, and wherein the processor and memory are operative with a program (e.g., herein referred to as TurboDictionary™) stored on the storage device to: receive a user-selected word of Web page text; receive user-selected reference source and/or user-selected translation language pair preferences; access information relating to the user-selected word in real time, and in accordance with the user-selected reference source or user-selected translation language pair; and transmit the accessed information relating to the user-selected word to the client-side user. The software program of the present invention can be implemented as a stand-alone program on a particular Web site provider's server. Alternatively, the software may be implemented on an independent server that is linked to the provider's server.

The databases on, or connected to the server, contain the information necessary to make the inventive apparatus and method work. The information retrieval databases of the present invention are relatable, and are assembled and accessed using any commercially-available database software, such as Microsoft Access™, Oracle™, Microsoft SQL™ Version 6.5, etc., and other search engine technologies and algorithms as described herein above.

A user (client) subsystem generally includes a processor attached to storage unit, a communication controller, and a display controller. The display controller runs a display unit through which the user interacts with the subsystem. In essence, the user subsystem is a computer able to run software providing a means for communicating with the server. This software, for example, is an Internet web browser such as Microsoft Internet Explorer, Netscape Navigator, or other suitable Internet web browsers. The user subsystem can be a computer or hand-held electronic device, such as a telephone or wireless telephone or other PDA-type device that enables Internet access.

Combination Translation and Search Functions. The information retrieval function of the present method and apparatus, including storage devices and server-side databases, are operative with Internet search engines, such as I-Search®, stored on the storage device to provide combined translation and Internet search functions in accordance with particular user-selected Web site text and/or information source and/or language pair preferences. In preferred embodiments, I-Search®, an art-recognized multi-language search engine (currently powering World-Trade-Search-.com) is used in combination with software of the present invention (e.g., TurboDictionary™), but other art-recognized Internet search engines (e.g., Yahoo™, Google™, and AltaVista®) are productively used in combination with the instant method and apparatus, and are encompassed within the scope of the present invention. As described above for the inventive information retrieval process, both integrated server- and client-side implementations of such combined translation/search functions are contemplated.

Figure 7A:
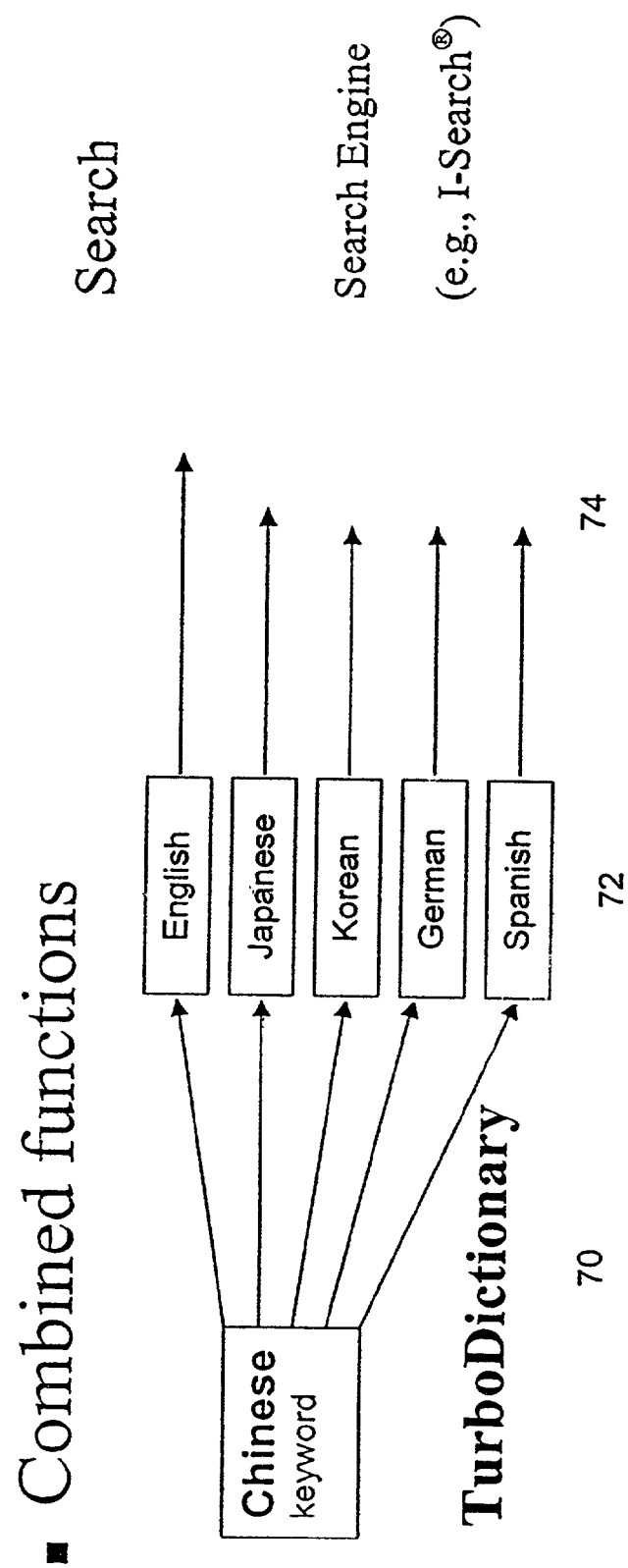
FIG. 7A shows an embodiment of the present invention enabling combined translation and Internet search functions in accordance with particular user-selected Web site text and/or information source and/or language pair preferences. Here, a Chinese-speaking user activates (according to the present invention) the information retrieval function 70, in accordance with one or more particular translation language preferences, to simultaneously translate a user-selected text ("key word") into one or more languages/character sets 72 (e.g., using TurboDictionary™, according to the present invention). The translations are accessed by an Internet search engine (e.g., I-Search®) to enable a user to simultaneously search the internet in multiple languages 74, based on the users native language and selected key word.
Figure 7B:
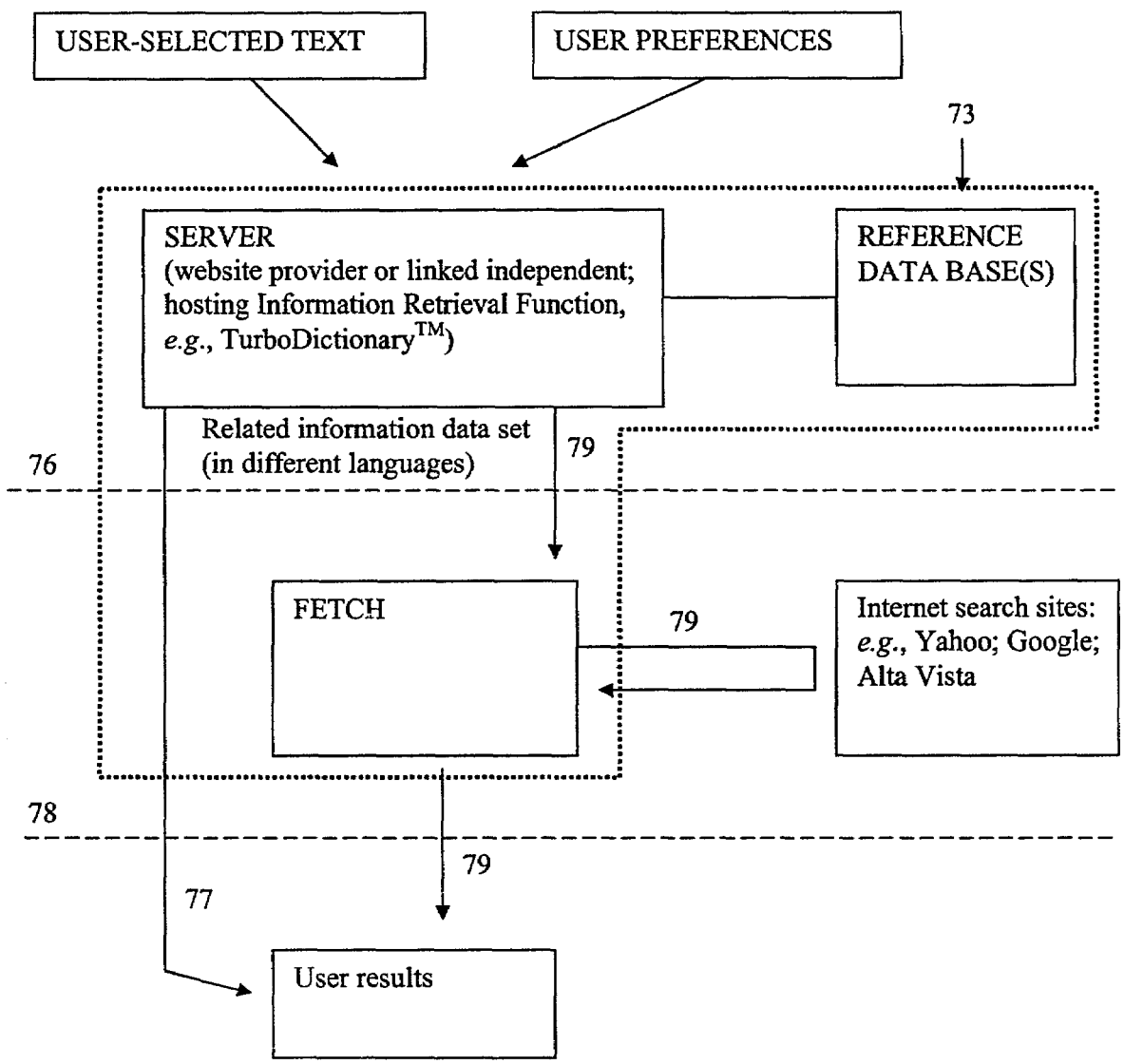
FIG. 7B shows a more detailed diagram of the combined translation and Internet search embodiment of FIG. 7A, including certain structural elements. The core "translate" and display embodiment of the inventive method is shown in combination with an automated Internet search, using the related information data set to obtain related Internet search information which is displayed to the user along with the related information data set (combined path arrows 77 and 79). The core server-side translation and search functionality of the information retrieval function is shown enclosed in dotted lines 73, with user selection and display occurring on the client side.

FIGS. 7A and 7B illustrate an embodiment of the present invention enabling combined translation and Internet search functions in accordance with particular user-selected Web site text and/or information source and/or language pair preferences. In FIG. 7A, a Chinese-speaking user activates the information retrieval function 70, in accordance with one or more particular translation language preferences, to simultaneously translate user-selected text ("key word") into one or more languages/character sets 72 (e.g., using TurboDictionary™, according to the present invention). The translations are accessed by an Internet search engine (e.g., I-Search®) to enable a user to simultaneously search the Internet in multiple languages 74, based on the users native language and selected key word. FIG. 7B shows a more detailed diagram of the combined translation and Internet search embodiment of FIG. 7A, including certain structural elements. The elements and steps above and below dashed lines 76 and 78, respectively, illustrate the core "translate" and display embodiment of the inventive method, comprising user selection of text and preferences for reference sources and translation language, accessing by the information retrieval function of a related information data set, based on related data stored in reference data base(s), and display of the data set to the user (path arrow 77). Optionally, as shown between the dashed lines 76 and 78, the related information data set is used to perform an automated Internet search to obtain related Internet search information which is displayed to the user along with the related information data set (combined path arrows 77 and 79). The core server-side translation and search functionality of the information retrieval function is shown enclosed in dotted lines 73, with user selection and display occurring on the client side.

Additional Wireless Device Embodiments. In alternate embodiments, the integrated user-directed information retrieval function of the present invention (using, e.g., TurboDictionary™) is implemented in the context of a wireless network (e.g., WAP server-based), and voice recognition function to provide a real-time voice translator and reference tool. This novel implementation is herein referred to as TurboTalk™. Specifically, the wireless embodiments provide an apparatus and integrated method, over a wireless network comprising a server side (e.g., WAP-based) and a client side (e.g., cellular phones, or other PDA (personal data assistant) wireless devices, e.g., Palm PC, Pocket PC, PSION, etc.), for user-directed acquisition of real-time translation and reference services in both text and voice, using standard cellular phones and PDA devices (voice-to-text, voice-to-voice, text-to-voice and text-to-text). Generally, the implementation of the inventive information retrieval function, comprising reference access and generation of a related information data set are as described in detail herein above for TurboDictionary™. However, TurboTalk™ embodiments further comprise voice recognition/conversion software voice-recognition software stored in the memory of the WAP server and operative with a processor of the server to recognize the voice and process it into text (or process text to voice). Preferably, this embodiment is offered as a wireless service by wireless service providers to subscribing users.

In preferred embodiments, a wireless carrier offers the TurboTalk™ service, which enables a subscribing user, speaking in their native tongue, to spontaneously speak, for example, Greek while in Greece, and Japanese while in Japan without knowing either Greek or Japanese. That is, travelers can use the TurboTalk™ service to communicate with local people.

Figure 8:
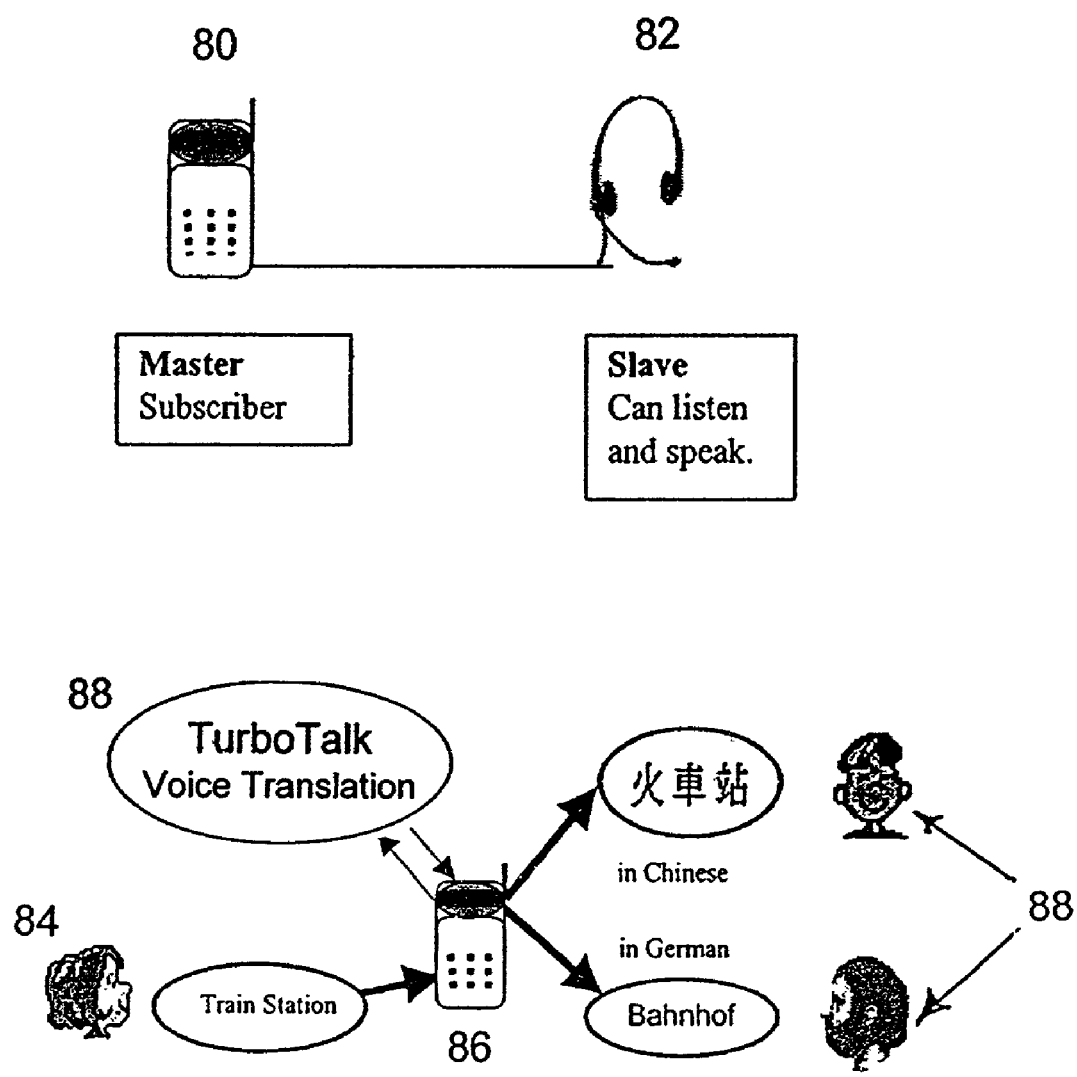
FIG. 8 (upper panel) shows apparatus for a wireless embodiment of the present invention. Communication proceeds between a "master" user, having a cellular phone 80 subscribing to the TurboTalk™ service (described herein), and a "slave" user, having either a plug-in headset 82 connected to the master device, or having another wireless device accessible by the master device.

FIG. 8 shows a preferred embodiment, wherein communication proceeds between a "master" user, having a cellular phone 80 subscribing to the TurboTalk™ service, and a "slave" user, having either a plug-in headset 82 connected to the master device, or having another wireless device accessible by the master device (FIG. 8, upper half). The system is compatible with the use of a plurality of "slave" devices in connection with one or more master "devices" receiving messages in one or more translated languages. In such instances, the master user selects language preferences for each slave.

FIG. 8 (lower panel) shows such a WAP-based wireless embodiment. A "master" user 84 selects one or more translation language pairs (in this case, English→Chinese and English→German) using a GSM (Global System for Mobiles) phone 86 accessible by a WAP server 88 hosting the inventive information retrieval function (e.g., the method described herein using TurboDictionary™). The user sends a voice message ("train station") using the cellular phone, and the message is processed using voice-recognition software stored in the memory of the WAP server and operative with a processor of the server to recognize the voice and process it into text. The information retrieval function translates the text, which is then converted to voice by the voice recognition function, and delivered as a voice message (in Chinese and/or German) over the wireless network to the "slave" users 88.

Figure 9:
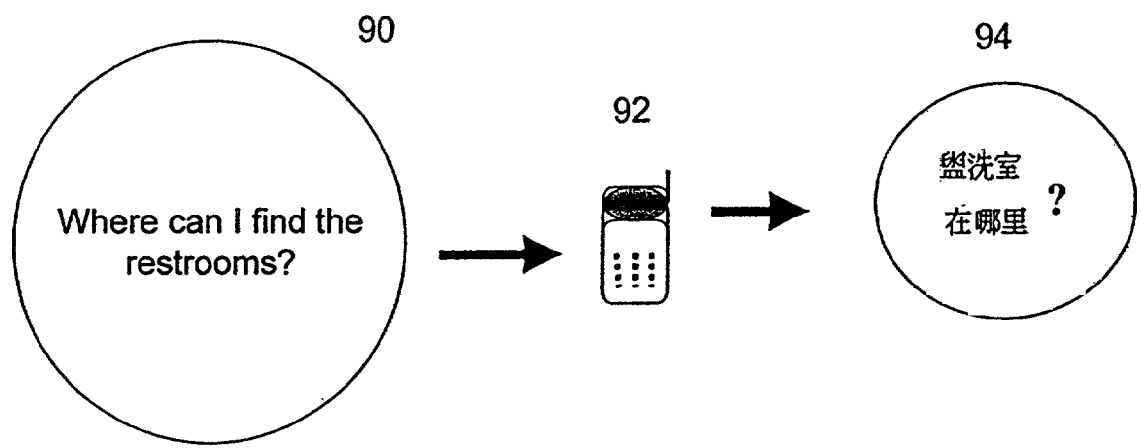
FIG. 9 shows a simpler WAP-based wireless embodiment involving a single "master" user and a single "slave" user. The master user selects single translation language pair, and sends a voice message 90 using the cellular phone 92, and the message is processed using voice-recognition software stored in the memory of a WAP server and operative with a processor of the server to recognize the voice and process it into text. The information retrieval function translates the text, which is then converted to voice by the voice recognition function, and delivered as a translated voice message 94 over the wireless network to the "slave" user.

FIG. 9 shows a simpler WAP-based wireless embodiment involving a single "master" user and a single "slave" user. The master user selects single translation language pair (in this case, English→Chinese), and sends a voice message 90 ("Where can I find the restrooms?") using the cellular phone 92, and the message is processed using voice-recognition software stored in the memory of a WAP server and operative with a processor of the server to recognize the voice and process it into text. Preferably, the information retrieval function translates the text, which is then converted to voice by the voice recognition/conversion function, and delivered as a voice message 94 (in Chinese) over the wireless network to the "slave" user. Alternatively, depending upon the capabilities of the slave device, the translated information is delivered to the slave user in text, or multimedia formats compatible with the slave user's native language and character set.

WAP-based embodiments primarily involve the use of standard WML and WMLScript, but many different cellular phones (User Agents) have slight modifications to the WAP standard. Therefore, a database of User Agents and their respective differences is operative with the inventive method and apparatus to ensure that all devices are compatible with TurboTalk™.

In preferred embodiments, master users may retrieve information related to selected voice or text messages, in addition to voice message translations. Such related information, as described herein above, comprises high quality multi-lingual translations, explanations, illustrations and/or consolidated automatic multi-dictionary definitions ("look-ups"), wherein such information is displayed to the user in text, voice, image or multi-media formats that correspond, or are at least compatible with the user's wireless device, and with the user's native language or character set.

Various integrated server-side and client-side embodiments of the present invention have been described above, including embodiments combined with multi-language search engines. Additionally the server-integrated user-directed information retrieval function of the present invention can be implemented in the context of a wireless network (e.g., WAP server-based), and voice recognition function to provide a real-time voice translator and reference tool that can be used to communicate between two, or among a plurality of "master" and "slave" users. A person skilled in the art will, however, recognize that many additional embodiments are encompassed within the scope of the present invention. In particular, other embodiments are possible that incorporate additional or different art-recognized features and that apply to additional types and formats of retrievable information.

What is claimed is:

1. An integrated method, over a wide area network having a server side and a client side, for user-directed acquisition of information relating to user-selected text of World Wide Web site pages, comprising:

selecting by a user a word of web page text, whereby the user-selected word is accessible by an information retrieval function;

selecting by a user from a plurality of reference sources and translation language pairs, at least one reference source and a translation language pair, whereby the user-selected reference source and user-selected translation language pair are accessible by an information retrieval function;

accessing and retrieving from the user-selected reference source, using the information retrieval function, information relating to the user-selected word in accordance with the user-selected reference source and user-selected translation language pair; and displaying to the user, based on the accessed and retrieved related information, a related information data set, wherein the selecting and displaying are integrated into the web page, and whereby user-directed acquisition of information relating to user-selected text of World Wide Web site pages is achieved.

2. The method of claim 1, wherein the method steps are integrated into a server-side web site by either incorporating into the site a reference window linked to the information retrieval function, or by installing programmed script on all web pages of the site to link and enable the information retrieval function.

3. The method of claim 1, wherein the method steps are integrated into a client-side system using downloadable software or a browser plug-in that is operatively linked to the information retrieval function.

4. The method of claim 1, wherein selecting of a word of web page text is achieved by typing, or pasting of a copy of the word into a window linked to an information retrieval function, or by highlighting the word, whereby the typing, pasting, or highlighting renders the user-selected word accessible by an information retrieval function.

5. The method of claim 1, wherein at least one reference source is a dictionary.

6. The method of claim 1, wherein the information relating to user-selected text of World Wide Web site pages is selected from the group consisting of high quality multilingual translations, explanations, and consolidated automatic multi-dictionary definitions, and wherein such information is displayed to the user in text, voice, image or multi-media formats.

7. The method of claim 1, wherein the information retrieval function further comprises an Internet search engine operative with the information retrieval function to search the Internet in accordance with the user-selected text, retrieved related information, or related information data set, thereby augmenting the information retrieval function.

8. The method of claim 1, wherein selecting of a reference source or a translation language pair comprises pre-selecting either or both of the reference source or the translation language pair for storing as a default user preference, and wherein accessing and retrieving by the information retrieval function is according to the stored default user preference.

9. The method of claim 8, wherein the user preference is stored on the server side.

10. The method of claim 1, wherein selecting by the user comprises selecting a plurality of reference sources for simultaneous accessing by the information retrieval function.

11. The method of claim 1, further comprising storing of either or both of the retrieved related information, or the related information data set.

12. The method of claim 11, wherein the storing of either or both of the retrieved related information or the related information data set is on the server-side.

13. The method of claim 1, further comprising ranking of either or both of the retrieved related information or the related information data set according to relevancy, using one or more relevancy algorithms.

14. The method of claim 13, further comprising sorting, using one or more sorting algorithms, of either or both of the retrieved related information or the related information data set into a plurality of relevancy ranked sub-data sets, whereby the sub-data sets are alternately or sequentially displayable to the user.

15. The method of claim 1, wherein at least one of hashing or BTree data structures are used to process data accessed by the information retrieval function.

16. An integrated method, over a wide area network having a server and a client, for user-directed acquisition of information relating to user-selected text of World Wide Web site pages, comprising:

receiving from the client a user-selected word of World Wide Web page text;

receiving from the client at least one user-selected reference source and a user-selected translation language pair;

accessing and retrieving from the user-selected reference source stored on a server, information relating to the user-selected word, in accordance with the user-selected reference source and the user-selected translation language pair; and transmitting to the client for display to the user, a related information data set, based on the accessed and retrieved related information, wherein selection by and display to the user are integrated into the World Wide Web page.

17. The method of claim 16, wherein accessing and retrieving information relating to the user-selected word further comprises an Internet search engine operative with the server to search the Internet in accordance with the user-selected text, retrieved related information, or related information data set.

18. The method of claim 16, wherein the information relating to user-selected text of World Wide Web site pages is selected from the group consisting of high quality multilingual translations, explanations, and consolidated automatic multi-dictionary definitions, and wherein such information is displayed to the user in text, voice, image or multi-media formats.

19. The method of claim 16, wherein user selecting of a reference source or a translation language pair comprises pre-selecting either or both of the reference source or the translation language pair for storing as a default user preference, and wherein the accessing and retrieving by the information retrieval function is according to the stored default user preference.

20. The method of claim 16, wherein a plurality of user-selected reference sources are received from the client.

21. The method of claim 16, further comprising storing of either or both of the retrieved related information, or the related information data set.

22. The method of claim 16, further comprising ranking of either or both of the retrieved related information or the related information data set according to relevancy, using one or more relevancy algorithms.

23. The method of claim 22, further comprising sorting, using one or more sorting algorithms, of either or both of the retrieved related information or the related information data set into a plurality of relevancy ranked sub-data sets, whereby the sub-data sets are alternately or sequentially displayable to the user.

24. The method of claim 16, wherein at least one of hashing or BTree data structures are used to process retrieved data.

25. An apparatus for user-directed acquisition, over a wide area network having a server side and a client side, of information relating to user-selected text of World Wide Web site pages, comprising:

a server connected to the network, wherein the server comprises a processor, a memory, and a storage device, and wherein the processor and memory are operative with a program stored on the storage device to receive from the client a user-selected word of World Wide Web page text;

receive from the client at least one user-selected reference source and user-selected translation language pair;

access and retrieve from the user-selected reference source stored on the server, information relating to the user-selected word, in accordance with the user-selected reference source and the user-selected translation language pair; and transmit to the client for display to the user, a related information data set, based on the accessed and retrieved related information, wherein selection by and display to the user are integrated into the World Wide Web page.

26. The apparatus of claim 25, further comprising an Internet search engine operative with the server to search the Internet in accordance with the user-selected text, retrieved related information, or related information data set.

27. An integrated method, over a wireless network having a server side and a client side, for user-directed acquisition of real-time translation and reference services in both text and voice, comprising:

selecting, by a client-side user, at least one translation language pair and at least one reference source, whereby the user-selected translation language pair and reference source are accessible by a WAP-based server having information retrieval and voice-recognition functions;

sending by the client-side user a voice message comprising one or more spoken words to the WAP-based server;

accessing and retrieving from the user-selected reference source, using the information retrieval and voice recognition functions, information relating to the voice message in accordance with the user-selected reference source and user-selected translation language pair; and displaying to the client-side user or to someone connected thereto, based on the accessed and retrieved related information, related text or voice, whereby user-directed acquisition of real-time translation and reference services in both text and voice is achieved.

28. The method of claim 27, wherein selecting of a reference source or a translation language pair comprises pre-selecting either or both of the reference source or the translation language pair for storing as a default user preference.

29. The method of claim 27, wherein at least one reference source is a dictionary.

30. The method of claim 27, wherein selecting by the user comprises selecting a plurality of reference sources for simultaneous accessing and retrieving by the information retrieval function.

* * * * *